(12) United States Patent
Åström et al.

(10) Patent No.: US 8,489,682 B2
(45) Date of Patent: Jul. 16, 2013

(54) SUPPLEMENTARY SERVICES IN COMMUNICATION NETWORKS

(75) Inventors: Bo Åström, Stockholm (SE); Stephen Terrill, Villanueva de la Cañada (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 904 days.

(21) Appl. No.: 12/526,291

(22) PCT Filed: Feb. 16, 2007

(86) PCT No.: PCT/EP2007/051534
§ 371 (c)(1),
(2), (4) Date: Nov. 24, 2009

(87) PCT Pub. No.: WO2008/098619
PCT Pub. Date: Aug. 21, 2008

(65) Prior Publication Data
US 2010/0088374 A1   Apr. 8, 2010

(51) Int. Cl.
*G06F 15/16* (2006.01)
(52) U.S. Cl.
USPC ..... 709/204; 709/226; 455/414.1; 455/432.1; 455/433; 455/435.1
(58) Field of Classification Search
USPC .............. 709/204, 226; 455/414.1, 432.1, 455/433, 435.1
See application file for complete search history.

(56) References Cited

U.S. PATENT DOCUMENTS

| | | | | |
|---|---|---|---|---|
| 5,428,665 A * | 6/1995 | Lantto | | 455/414.1 |
| 5,752,188 A * | 5/1998 | Astrom et al. | | 455/433 |
| 5,850,603 A * | 12/1998 | Lantto et al. | | 455/433 |
| 6,044,264 A * | 3/2000 | Huotari et al. | | 455/414.1 |
| 6,081,711 A * | 6/2000 | Geulen | | 455/432.1 |
| 6,097,942 A * | 8/2000 | Laiho | | 455/414.1 |
| 6,330,445 B1 * | 12/2001 | Skog et al. | | 455/433 |
| 6,745,029 B2 * | 6/2004 | Lahtinen et al. | | 455/432.1 |
| 7,031,707 B1 * | 4/2006 | Rune et al. | | 455/433 |
| 2004/0235476 A1 * | 11/2004 | Martlew | | 455/436 |
| 2005/0075109 A1 * | 4/2005 | Neyret et al. | | 455/445 |
| 2005/0107100 A1 * | 5/2005 | Gustafsson et al. | | 455/466 |
| 2006/0105766 A1 * | 5/2006 | Azada et al. | | 455/432.1 |
| 2006/0258394 A1 | 11/2006 | Dhillon et al. | | |
| 2007/0286367 A1 * | 12/2007 | McCann et al. | | 379/114.2 |
| 2010/0046501 A1 * | 2/2010 | Witzel et al. | | 370/352 |
| 2012/0214459 A1 * | 8/2012 | Zabawskyj et al. | | 455/417 |

FOREIGN PATENT DOCUMENTS

| | | |
|---|---|---|
| GB | 2 426 410 A | 11/2006 |
| WO | WO 95/20299 A | 7/1995 |
| WO | WO 96/20572 A | 7/1996 |
| WO | WO 03/009615 A | 1/2003 |
| WO | WO 2004/054293 A | 6/2004 |

* cited by examiner

*Primary Examiner* — Oleg Survillo

(57) ABSTRACT

A method and application server for handling a supplementary services message in a communication network. A subscriber's Home Location Register (HLR) sends an Interrogation marker to the subscriber's Mobile-services Switching Center/Visitor Location Register (MSC/VLR) instructing the MSC/VLR to forward all supplementary services messages from the subscriber to the HLR. When the subscriber's user terminal sends a supplementary services message to the MSC/VLR requesting a supplementary service, the MSC/VLR forwards the message to the subscriber's HLR. The HLR retrieves an address of an IP Multimedia Application Server associated with the subscriber, and sends the supplementary services message to the addressed Application Server for handling the supplementary services request.

6 Claims, 9 Drawing Sheets

Basic services supported:

| Basic service group | Basic Service number | | Tele service |
|---|---|---|---|
| 1 | Speech | TS 11 | Telephony |
| | | TS 12 | Emergency call |
| 2 | Short message service | TS 21 | Short message MT / PP |
| | | TS 22 | Short message MO / PP |
| 6 | Facsimile services | TS 61 | Alternate speech and facsimile group 3 (GSM only) |
| | | TS 62 | Automatic facsimile group 3 |

Bearer service

| | | | |
|---|---|---|---|
| 7 | All Data circuits asynchronous | BS 20 | General asynchronous bearer service |
| | | BS 21 | Data circuit duplex asynch. 300 bit/s |
| | | BS 22 | Data circuit duplex asynch. 1200 bit/s |
| | | BS 24 | Data circuit duplex asynch. 2400 bit/s |
| | | BS 25 | Data circuit duplex asynch. 4800 bit/s |
| | | BS 26 | Data circuit duplex asynch. 9600 bit/s |

Figure 2 (prior art)

| IMS; Supplementary Services for MMTel | GSM/UMTS, Supplementary Services for Telephony |
|---|---|
| OIP Originating Indication Presentation (CLIP)<br>OIR Originating Indication Restriction (CLIR) | CLIP Calling Line Identification Presentation<br>CLIR Calling Line Identification Restriction |
| TIP Terminating Indication Presentation (COLP)<br>TIR Terminating Indication Restriction) (COLR) | COLP Connected Line Identification Presentation<br>COLR Connected Line Identification Restriction |
| CDIV Call Diversion (Call Forwarding)<br>Unconditional, Busy, No Answer, No Reply | Call Forwarding<br>Unconditional, Busy, No Answer, No Reply |
| HOLD/WAITING Call Hold (e.g. when a second incoming<br>(Mid-call) call reaches a terminal already active in<br>a call) | Call Waiting<br>Call Hold<br>(Mid-call) |
| CB Call Barring<br>Incoming and Outgoing conditions exist<br>ACR Anonymous Call Rejection | CB Call Barring<br>Incoming and Outgoing conditions exist |
| MWI Message Waiting Indication (indicates to a user<br>that a message has been stored in a mail<br>system | -<br>(SMS, voice callback are examples of notification methods used in GSM/UMTS, but they are not supplementary services) |
| CONF Conference Call<br>(Mid-call) | Multiparty Call<br>(Mid-call) |
| ECT Explicit Call Transfer<br>(Mid-call) | ECT Explicit Call Transfer<br>(Mid-call) |
| - | AoC Advice of Charge |
| - | CUG Closed User Group |
| - | USSD Unstructured SS Data |

Figure 4 (prior art)

SUPPLEMENTARY SERVICES IN COMMUNICATION NETWORKS

FIELD OF THE INVENTION

The invention relates to the field of Supplementary Services in communications networks.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services.

IP Multimedia Subsystem (IMS) is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The integration of an IP Multimedia Subsystem into a 3G mobile communications system is illustrated schematically in FIG. 1.

IMS relies on Internet Protocol (IP) as a transport technology. Using IP for voice communications, however, presents some challenges, especially in the mobile community where Voice Over IP (VoIP) enabled packet switched (PS) bearers may not always be available. To allow operators to start offering IMS-based services while voice enabled PS-bearers are being built out, the industry has developed solutions that use existing Circuit Switched (CS) networks to access IMS services. These solutions are referred to as IMS Centralized Services (ICS). ICS is also the name of the Work Item in 3GPP Release 8 addressing these matters.

Supplementary Services in GSM/UMTS

Global System for Mobile Communications (GSM)/Universal Mobile Telecommunications System (UMTS) allows subscribers to apply supplementary services to basic services. An example of a supplementary service (SS) is the Call Forwarding SS. The Call Forwarding SS is a service for forwarding all incoming calls, for example to a voice mail system. In this example, Call Forwarding is the supplementary service and telephony is an example of a basic service. Basic Services are grouped into tele-services and bearer services, and telephony is one of the GSM defined tele-services. The basic services available in GSM/UMTS are illustrated in FIG. 2.

SS-operations are used to manipulate supplementary services. For example, an SS-Operation is used set a forwarded-to-number with a voice mail system. These procedures are also referred to as Call Independent SS procedures and they take place between a user terminal (which may be a mobile station, User Equipment, or other means of accessing the CS access network) and the subscriber's Home Location register (HLR). After a successful SS-Operation, the data relating to the supplementary service is updated in the HLR. Note that in this documents, the term HLR is used to refer to either an HLR or HLR functionality in another node such as a Home Subscriber Server (HSS).

Some supplementary services are handled by a Mobile-services Switching Centre (MSC) or Visitor Location register (VLR). An example of such a service is Call Forwarding On Busy. For these services, the HLR updates the MSC/VLR with the new data with an Insert Subscriber Data procedure.

The available SS-Operations are:
Register SS
Deregister SS
Activate SS
Deactivate SS
Interrogate SS
USSD operations:
Process Unstructured SS Request
Unstructured SS Request
Unstructured SS Notify Registration for a supplementary service in a GSM/UMTS network is shown in FIG. 3.

Different SS-Operations are used for different supplementary services, that is to say that not all supplementary services use all of the SS-operations. Applicable SS-Operations are defined for each type of supplementary service. For all supplementary services, it is possible to check the status of the supplementary service, that is to say whether or not a supplementary service is currently active, and what data has been set for the supplementary service. This is performed using the Interrogate SS-Operation.

Generic signalling principles for supplementary services are described in 3GPP TS 24.010. Signalling for individual supplementary services is described in the specifications 3GPP TS 24.072-24.093.

In additional to the call independent SS-procedures, there are call dependent SS-procedures which are executed by the MSC/VLR. Examples of these are call hold, call waiting and explicit call transfer. Call dependent SS-procedures are directly coupled to the execution of these services, e.g. notifying a busy subscriber of a waiting call, the ability for the subscriber to toggle between two calls, and so on. Activation of the call dependent SS-procedures is carried out using the call independent SS-procedures described above.

The SS-operations are hidden behind the terminal Man Machine Interface (MMI), e.g. the displayed menus for setting data for supplementary service in a mobile phone. It is, however, possible to manipulate SS-data by dialling certain Service Codes. For example, **21*telephone number*11# means that all calls for teleservice=11 (telephony) are to be forwarded to the indicated telephone number. 21 in the example is a service code for unconditional call forwarding.

Unstructured Supplementary Service Data (USSD) messages also contain a Service Code (SC). For user terminal-initiated USSD messages, the SC is generated by the user terminal or the subscriber, and includes digits, letters, and/or signs. Any SC that is not defined as a standardized supplementary service n the MS, is interpreted as USSD by the user terminal. SCs that are recognized are mapped to the SS-Operations as for the call forwarding example above.

IMS "Supplementary Services"

IMS multimedia telephony offers a number of standardized "supplementary services" (or service settings), many of which are similar to the GSM/UMTS supplementary services. The IMS supplementary services have extended capabilities for setting data that govern their execution, for example to define criteria for the execution of the "session forwarding" that is dependent on the caller, what media the session is intended for, etc.

IMS has a communication service concept that allows supplementary services to be defined and set specifically for each communication service. The IMS communication service most similar to the telephony tele-service is the Multimedia Telephony communication service (MMTel). Supplementary Services for Telephony (tele-service) and MMtel (IMS communication service) are shown in FIG. 4.

IMS uses eXtensible Markup Language Configuration Application Protocol (XCAP) signalling for manipulation of supplementary service data. As GMS/UMTS networks do not support XCAP, the SS-operations in GSM/UMTS cannot be used to set data for supplementary services in IMS.

Even though there are many similarities between the supplementary services for GSM/UMTS telephony and IMS MMTel, the procedures for operating on the SS-data are totally different. This becomes inconvenient when a subscriber using a CS access network wishes to use IMS services. IMS Centralized Service (ICS) enables services to be provided to users independent of the access that they are currently using. A subscriber may at a certain time only have a CS access available, and can then not perform any manipulations of supplementary services with XCAP, since XCAP signalling requires PS access. Furthermore, there is no support for "legacy terminals" that are not IMS capable but are equipped only with GSM/UMTS SS-Operations and cannot use the XCAP procedures defined for IMS.

Another problem arises when some services are provided by an IMS network, and also via the CS domain, depending on what domain the terminal is using at that time. If the services are not centralized as described above, then there is the risk that the user can be confused, as there are two independent sets of data. In such a case, a user, when accessing the network via the CS domain, may change their call forwarding settings. That user would be confused when, at a later time, the call forwarding settings do not apply if a call is received over the IMS.

Previous solutions to these problems have included:
Having XCAP signalling from an Access Gateway Control Function (AGCF). A MSC server could take on such a role. In such a solution, the MSC server would interpret SS procedures and initiate IMS XCAP messages.
The HLR could implement XCAP. In such a solution, the HLR processes the SS procedures from the circuit switched domain and initiates XCAP procedures towards the IMS. However, such a system requires that the HLR has knowledge of the IMS network that it will forward messages to, and must translate between protocols.

SUMMARY

The invention provides a subscriber service management solution for all or some of the supplementary services to be executed in the IMS network. Where some services are executed in the IMS network, and others in the CS access network, the services that may be executed in the CS access network are determined and controlled by a service engine in the IMS network.

According to a first aspect of the invention, there is provided a method of sending a supplementary services message in a communications network. The method comprises receiving, at a Home Location Register (HLR) node in a Circuit Switched network, a supplementary services message sent from a subscriber's Mobile-services Switching Centre/Visitor Location Register. The HLR then retrieves an address of an IP Multimedia Application Server associated with the subscriber, the Application Server used for handling supplementary service requests, and the HLR then sends the supplementary services message to the addressed Application Server.

The Application Server may be a Telephony Application Server, although other types of Application Server providing different services may also be used. Where the Application Server is a Telephony Application Server, the Telephony Application Server may be selected from a Telephony Application Server for an IP Multimedia Subsystem network, a Telephony Application Server-XML Document Management Server, a Telephony Application Server for an Intelligent Network and a Telephony Application Server for an H.323 network.

The method may comprise, prior to receiving the supplementary services message, sending an Interrogation marker from the Home Location Register node to the Mobile-services Switching Centre/Visitor Location Register, the Interrogation marker informing the Mobile-services Switching Centre/Visitor Location Register that all supplementary services messages received at the Mobile-services Switching Centre/Visitor Location Register from a user terminal are to be sent to the Home Location Register.

The method may further comprise, prior to receiving the supplementary services message, sending an Insert Subscriber Data message from the Home Location Register to the Mobile-services Switching Centre/Visitor Location Register, the Insert Subscriber Data message containing a CAMEL Mobility Management Service Indication which comprises the address of the Application Server, and sending a Mobility Management Notification message from the Mobile-services Switching Centre/Visitor Location Register to the addressed Application Server. Preferably, the Application Server generates a further Insert Subscriber Data message, the further Insert Subscriber Data message containing an allocation determined by the Application Server of which supplementary services are to be handled in the Circuit Switched network, and the Application Server then sends the further Insert Subscriber Data message from the Application Server to the Mobile-services Switching Centre via the Home Location Register.

It is preferred that the Application Server dynamically allocates the types of supplementary services that are handled by the Application Server, and the types of supplementary services that are handled by the Mobile-services Switching Centre/Visitor Location Register. This allows, for example, the operator of a network to specify where supplementary services depending of the user's subscription.

The method may further comprise sending a query message from the Application Server to user terminal via the Mobile-services Switching Centre/Visitor Location Register, the query message requesting additional supplementary services data that can be transported over the Circuit Switched network using Unstructured Supplementary Service Data. This is useful where the user's network does not support Session Initiation Protocol.

According to a second aspect of the invention, there is provided an Application Server for use in an IP Multimedia Subsystem network, the Application Server comprising:
a receiver for receiving a subscriber services message sent from a Home Location Register;
conversion means for converting the received message between protocols;
a processor for processing the subscriber services message.

The Application Server is therefore able to map incoming supplementary services Operations provided by the Home Location register an IMS Application server context. It is preferred that at least one of the protocols is selected from Mobile Application Part and Sh protocol.

The Application Server may further comprise means to allocate subscriber services to be handled by the Application server, and subscriber services to be handled by a node in the Circuit Switched network, means to generate an allocation message containing information specifying the allocation, and a transmitter for sending the allocation message to a Mobile-services Switching Centre/Visitor Location Register.

In order to allow the Application Server to request further information relating to the supplementary services message from a user terminal, the Application server may further comprise means to generate an Unstructured Supplementary Services Data message.

It is preferred that the Application Server is a Telephony Application Server.

According to a third aspect of the invention, there is provided a Home Location Register for use in a Circuit Switched network, the Home Location Register comprising:
  a receiver for receiving a supplementary services message sent from a subscriber's Mobile-services Switching Centre/Visitor Location Register;
  means for retrieving an address of an IP Multimedia Application Server associated with the subscriber, the Application Server used for handling supplementary service requests;
  a transmitter for transmitting the supplementary services message to the addressed Application Server.

The Home Location Register may comprise means to generate and send an Interrogation marker to a Mobile-services Switching Centre/Visitor Location Register, the Interrogation marker informing the Mobile-services Switching Centre/Visitor Location Register to forward all supplementary service interrogation messages to the Home Location Register.

The Home Location Register may further comprise means for receiving an Insert Subscriber Data message from the Application Server, the Insert Subscriber Data message containing information relating to an allocation of responsibility for handling a supplementary services request, and means for sending the Insert Subscriber Data message to a Mobile-services Switching Centre/Visitor Location Register.

According to a fourth aspect of the invention, there is provided a Mobile Switching Centre/Visitor Location Register for use in a Circuit Switched network, the Mobile Switching Centre/Visitor Location Register comprising:
  means for receiving a supplementary services Interrogation;
  means for ascertaining the presence of an Interrogation marker;
  means for forwarding the Interrogations to a Home Location Register if the Interrogation marker is present; and
  means for processing the Interrogation if the Interrogation marker is not present.

This ensures that if an Interrogation marker is present, then all supplementary services Interrogations received from a user terminal will be forwarded to the Home Location Register.

BRIEF DESCRIPTION OF THE DRAWINGS

FIG. 2 shows basic services in GSM/UMTS networks;

FIG. 4 shows supplementary services for GSM/UMTS and IMS networks;

DETAILED DESCRIPTION

Figure 1:
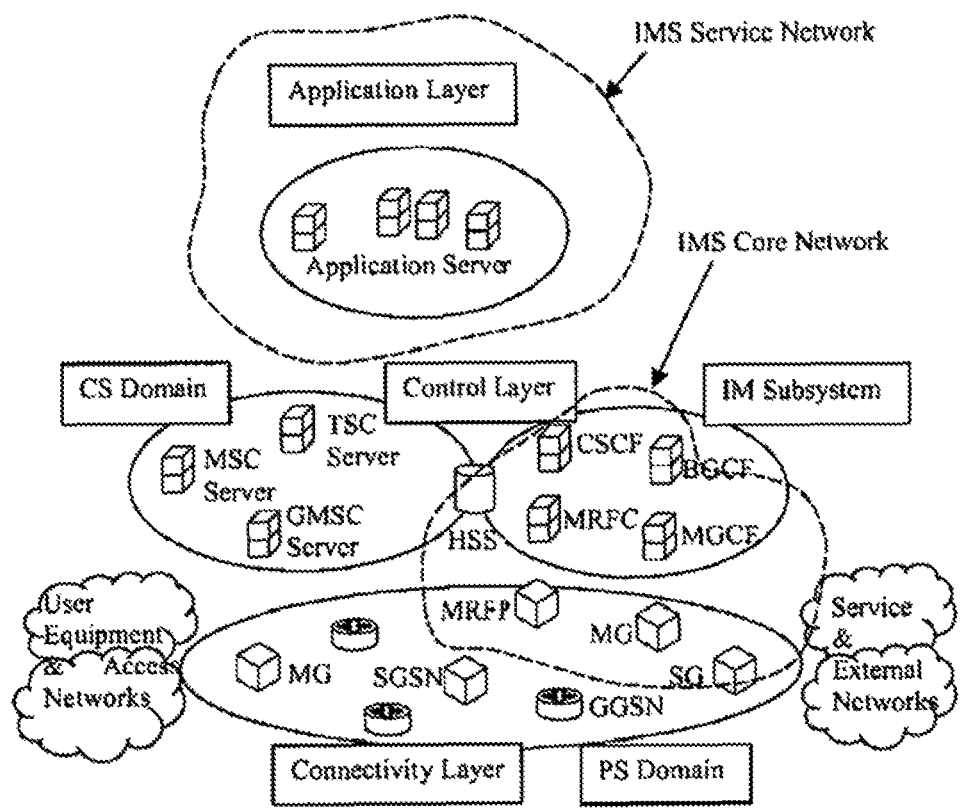
FIG. 1 illustrates schematically the integration of an IP Multimedia Subsystem into a 3G mobile communications system.
Figure 3:
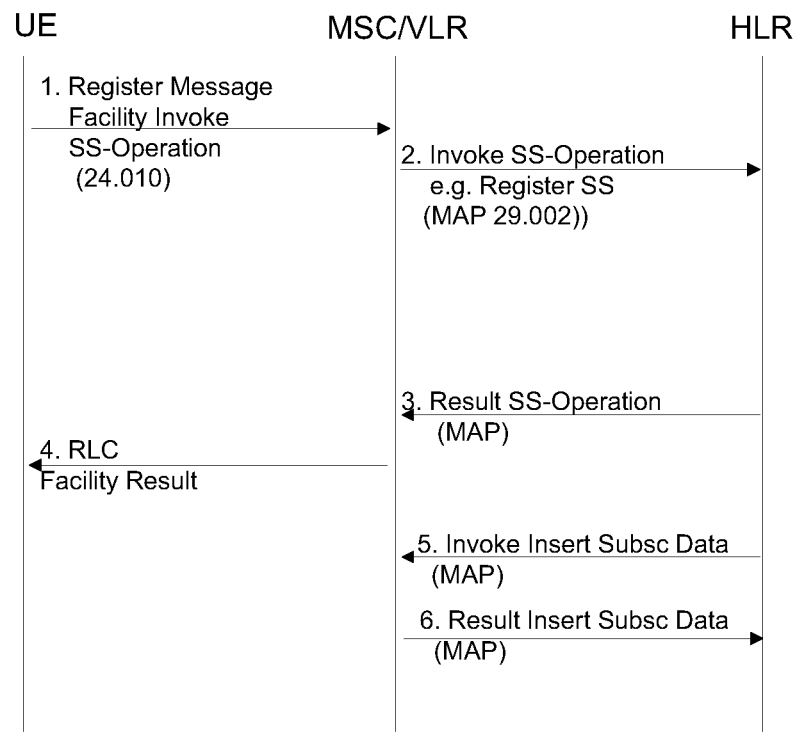
FIG. 3 is a signalling diagram for subscriber service management signalling, showing registration for a supplementary service in a GSM/UMTS network.
Figure 5:
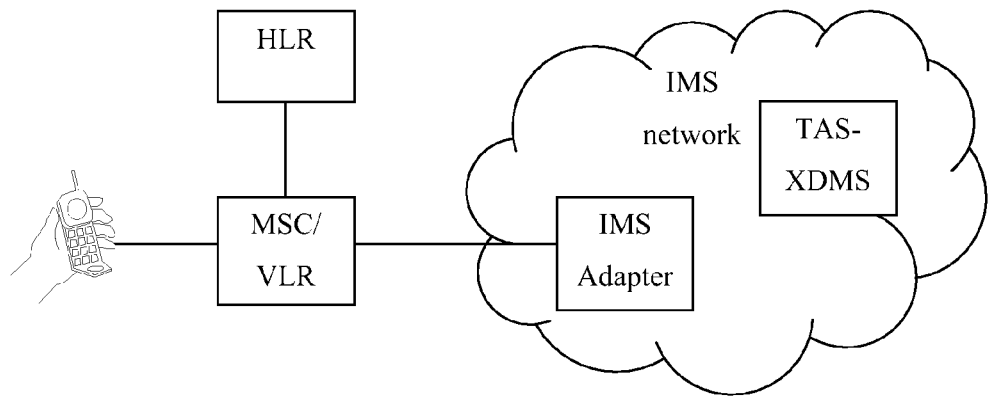
FIG. 5 illustrates schematically an example of the hardware required to access IMS services from a Circuit Switched network.

Referring to FIG. 5, a user terminal registers with a CS access network via a Mobile-services Switching Centre (MSC) and Visitor Location Register (VLR). The MSC/VLR obtains subscriber information from the subscriber Home Location register (HLR). Note that when referring to a HLR; this is either a home location register, or the home location register functionality of the HSS (Home subscriber server) as described in the 3GPP specifications. If the subscriber wishes to access an IMS network, this is typically done via an IMS Adapter (IA). This allows the user terminal to access services available from the IMS network (in FIG. 5, an example service is provided by a Telephony Application Server (TAS)-XML Document Management Server (XDMS).

In a first embodiment of the invention, most Supplementary Services for multimedia telephony are provided by the Multimedia Telephony (MMTel) communication service (provided by the TAS equipped with XDMS functionality for subscriber service management, herein referred to as TAS-XDMS) in an IMS network. All services are executed at the IMS service engine, but CS (GSM) SS-operations can be used for service management (Register/De-register/Activate/Deactivate/Interrogate) towards the IMS Service Engine, e.g. to register a call forwarding number. These are the "Call Independent Supplementary Service Procedures" described in 3GPP TS 24.010. A transport of mid-call signalling as described in, for example, 3GPP Release 8 "IMS Centralized Service" is required for invocation of Call Related Supplementary Services controlled by the MSC (Call Hold, Call Waiting, Multi-Party Calls).

A Location Update is the procedure when a terminal registers with the CS network. It is a prerequisite to perform a location update before any originating or terminating calls can be established. Subscriber data containing supplementary service data is typically transferred from the HLR to the visited MSC/VLR during the location update procedure. However, according to this embodiment, as all services are executed at an IMS network, the MSC/VLR need not store any supplementary service data, or execute any supplementary service. Subscriber service management is, however, still possible towards the service implementation in IMS represented by the TAS-XDMS.

Figure 6:
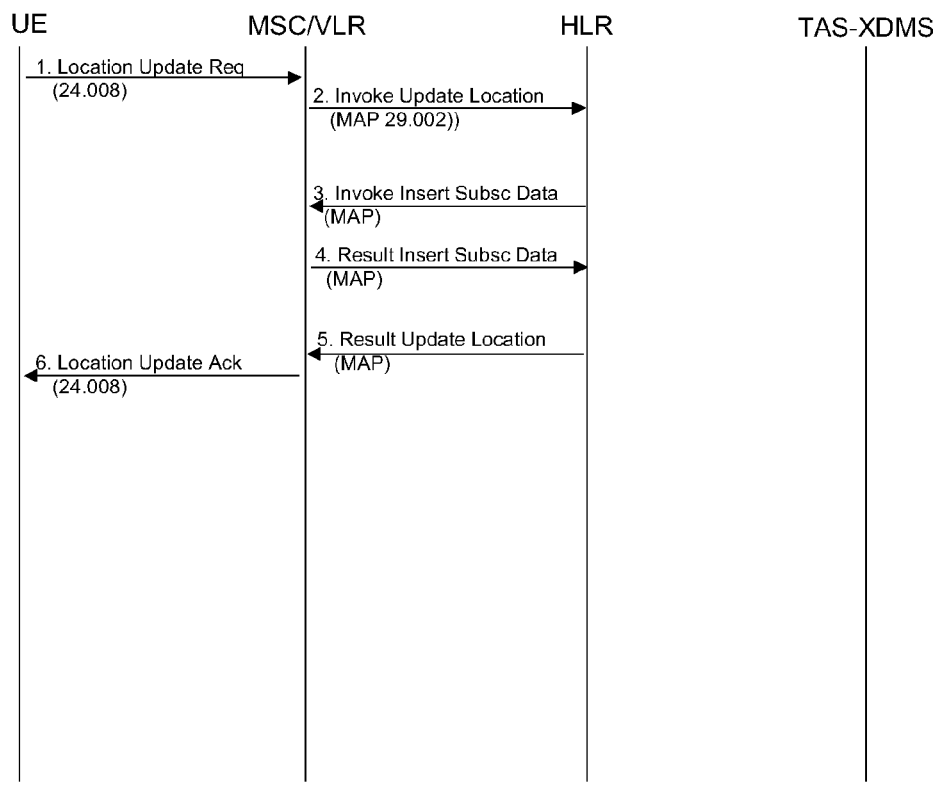
FIG. 6 is a signalling diagram showing a location update with a CS network according to an embodiment of the invention.

A location update with a CS network is shown in FIG. 6. The following steps are followed:

1. A Location Update request is sent from the user terminal to the MSC/VLR.

2. The MSC/VLR invokes an Update Location operation towards the HLR (Mobile Application part, MAP 29.002).

3. The HLR invokes an Insert Subscriber Data operation in the MSC/VLR to transfer subscriber data. The message sent in the Insert Subscriber Data operation contains a new marker in the Supplementary Services data to indicate to MSC/VLR that Interrogations that would normally be handled by MSC/VLR, for example for outgoing call barring, should now be forwarded to the HLR, and all SS-Operations (Register/Deregister/Activate/Deactivate/Interrogate) should be forwarded to the HLR. The Supplementary Services will not be executed by the MSC/VLR so they will thus not be registered/activated in CS. It is proposed to include this new marker in the Extension Container in the MAP data types: Forwarding Information, Call barring information and SS-Data. Note that the Interrogation marker is only needed for the SS-Operation; Interrogate. Other SS-Operations are always routed to HLR as normal.

4. The MSC/VLR acknowledges the Insert Subscriber Data with an outcome report.

5. The successful Update Location operation outcome report is sent from the HLR to the MSC/VLR.

6. The Location Update procedure terminates with a Location Update Ack sent to the user terminal.

Figure 7:
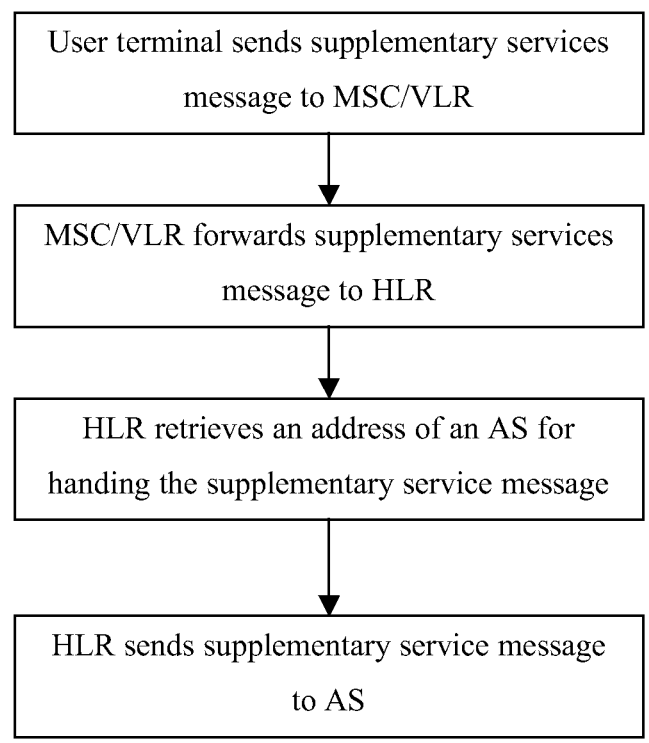
FIG. 7 is a flow diagram showing how supplementary services messages are forwarded.
Figure 8:
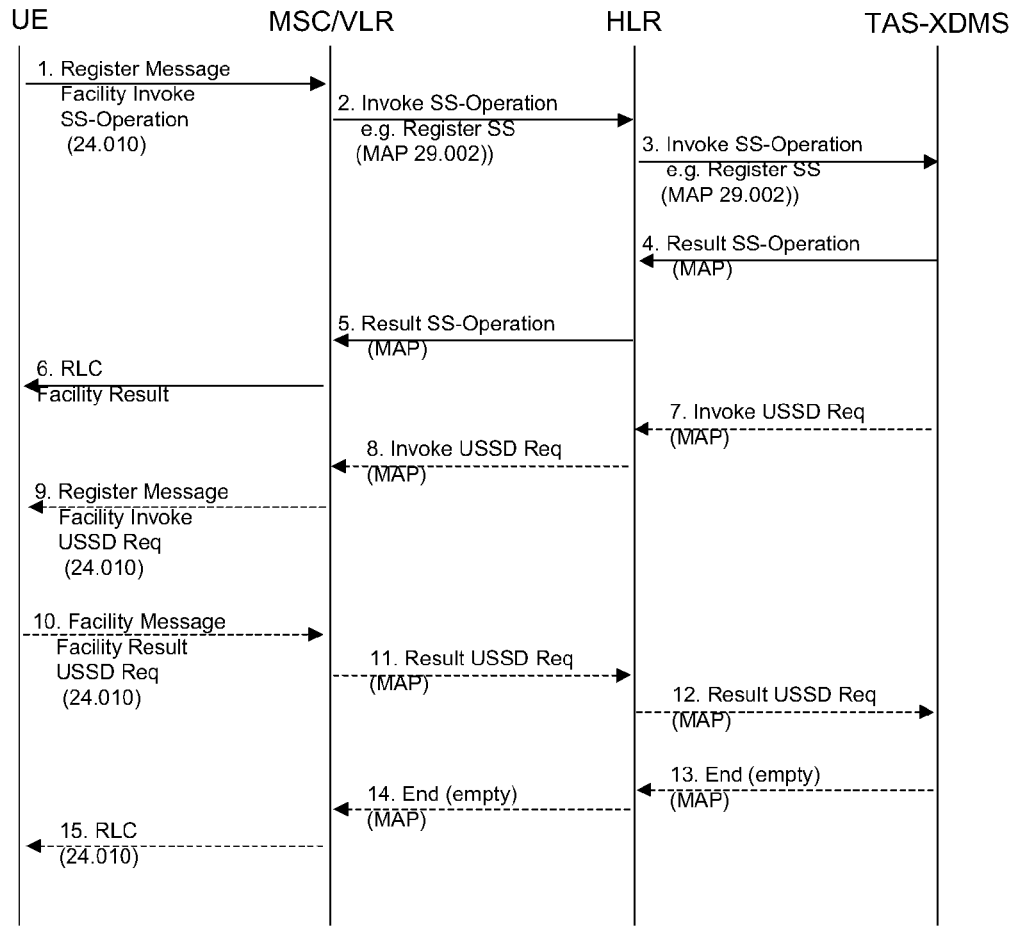
FIG. 8 is a signalling diagram showing invocation of a supplementary service according to an embodiment of the invention.

Once a subscriber has registered with the CS access network, supplementary services messages are handled as shown in FIG. 7. SS-Operations may be invoked as shown in FIG. 8.

1. The user terminal starts an SS-procedure by invoking an SS-operation, e.g. Register Call Forwarding Unconditional. A Register message containing a Facility information element carries the invoke component (3GPP TS 24.010).

2. The MSC/VLR invokes the corresponding SS-Operation in MAP (29.002). The invoke component in the Facility information element is sent to the HLR as an invoke component in the MAP message (TCAP Begin).

3. No SS-operations for the telephony tele-service (TS=11) are to be handled in the HLR. The HLR normally handles the SS-operations, but according to this embodiment, all SS-Operations are handled in the IMS network, and so the HLR forwards the SS-Operation for telephony to the MMTel service implementation in the IMS network. The MMTel implementation is logically grouped into a TAS and TAS-XDMS for service management of supplementary services. It is the TAS-XDMS that handles XCAP signalling for the MMTel service. The HLR is extended with new functionality to forward SS-Operations to an "external node". The forwarding follows the same principles as USSD to external node, i.e. to store an address per subscriber to the node external to the HLR that shall receive incoming SS-Operations. Here, the SS-Operations terminate in the TAS-XDMS and the external address is thus the TAS-XDMS address. The address may be a Signalling System No. 7 address (Global Title or Signalling Point Code) or an IP-address, depending on the connectivity available between the HLR and the TAS-XDMS. In forwarding the message, the HLR uses MAP, or as an alternative another protocol may be used, but the semantics of the message remains the same.

4. The TAS-XDMS is equipped with a MAP Plug-in for termination of MAP SS-Operations, or alternative protocols that come from the HLR. The TAS-XDMS is able to map the incoming SS-Operation provided by the GSM external node to an IMS TAS context.

5. The outcome report (return result) from the TAS-XDMS is sent via the HLR to the MSC/VLR (two different MAP dialogues exist; one between the MSC/VLR and the HLR, and one between the HLR and the TAS-XDMS). Note that no Insert Subscriber Data for the updated SS-procedures is sent to the MSC/VLR, since all services are executed in the IMS network by the TAS.

6. The result of the SS-operation is reported back to the user terminal.

7, 8, 9. The TAS-XDMS may optionally initiate a USSD procedure to query the ICS user for additional SS-Data that is not part of the GSM/UMTS SS-Operations but available for the MMTel supplementary services. Examples of such data include Presence settings, included media, and so on.

10, 11, 12. The user chooses one of the extended options for SS presented by the USSD operation and reports the choice back to the TAS-XDMS. The user may also choose to not use any of the extensions (which is given as an option in the USSD request generated by the TAS-XDMS).

The SS-Operations Register/Deregister/Activate/Deactivate are always sent to the HLR. This is normal MSC/VLR behaviour and shown in the example above. Some Interrogations do, however, stop in the MSC/VLR and are handled by the MSC/VLR without further signalling to HLR. The reason is that since MSC/VLR keeps a copy of the data and gets informed of changes (Insert Subscriber Data), the MSC/VLR can answer the interrogating UE directly.

The Interrogation cases directly handled by MSC/VLR are:

1. Call Forwarding Services:
Call Forwarding on Busy
Call Forwarding on No reply
Call Forwarding on No Answer
2. Line Presentation Services
Calling Line Presentation (CLIP)/Calling Line Presentation Restriction (CLIR)
Connected Line Presentation (COLP)/Connected Line Presentation Restriction (COLR)
3. Call Waiting
4. Call Barring
Outgoing Call barring (not Incoming Call barring, which is handled by the HLR)

The interrogation marker described above suppresses the interrogation functionality in the MSC/VLR and sends a received Interrogation to the HLR, which in turn forwards the Interrogation to TAS-XDMS as shown in FIG. 8. This has an impact on the behaviour of the MSC/VLR, and there may be circumstances where an operator would prefer to allow the IMS network to handle supplementary services without this impact on the MSC/VLR. In this case, it is possible to use a USSD procedure for all Interrogations where the TAS-XDMS queries the user terminal which service the interrogation is for. All other SS-Operations could be used as normal.

According to a second specific embodiment of the invention, selected supplementary services are executed by the CS service engine at the MSC/VLR. The services that are allowed to be executed by CS network are determined and controlled by the IMS service engine in the MMTel communication service. The following principles apply:

Services are divided between the IMS service engine and the CS Service Engine, but the IMS Service Engine (TAS) always dynamically decides how the services are divided.

CS SS-Operations are used for service management (Register/De-register/Activate/Deactivate/Interrogate) towards the IMS Service Engine, e.g. to register a call forwarding number.

CS SS-Operations can also be used for Supplementary Services executed by the CS Service Engine and the new mid-call signalling mechanism (ICCP) that is studied for ICS would not be required, i.e. for invocation of Call Related Supplementary Services when these execute in CS (MSC) (Call Hold, Call Waiting, Multi-Party Calls).

ICS users that currently use a PS access network can use SIP for Call Related Supplementary Services.

Figure 9:
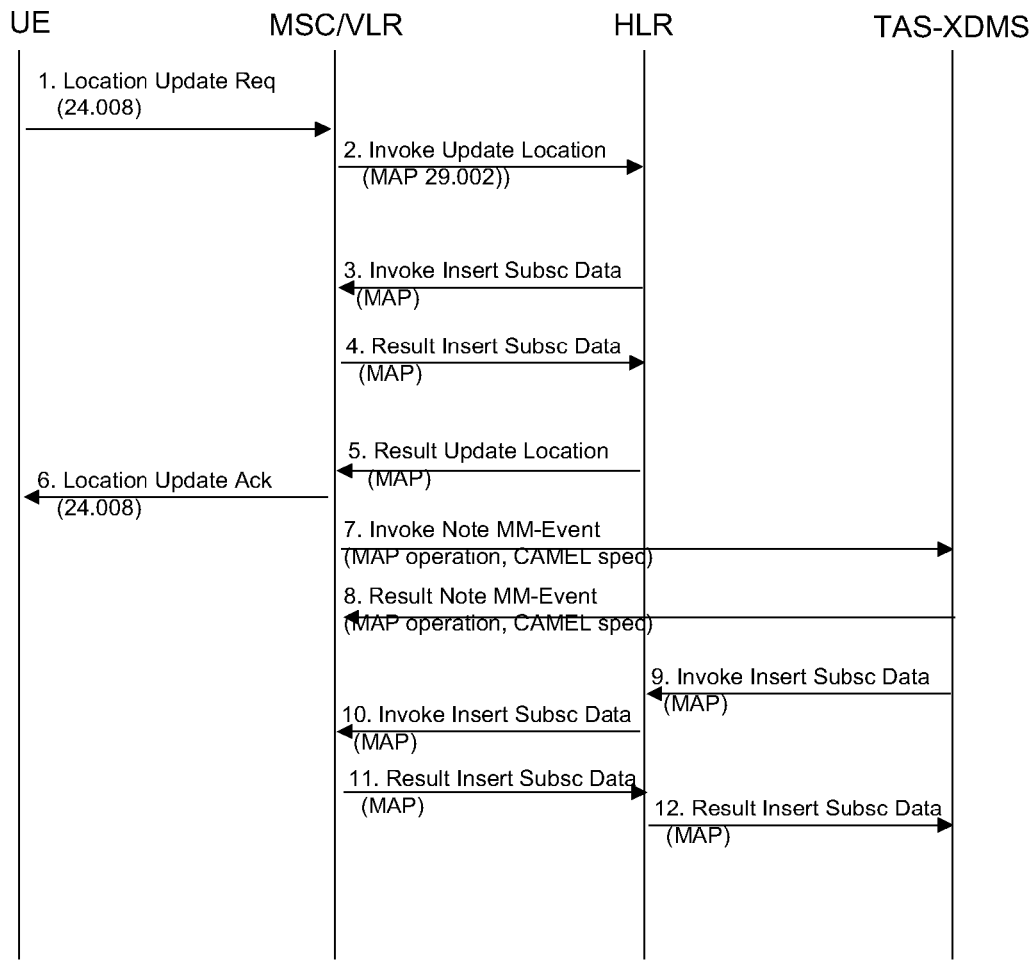
FIG. 9 is a signalling diagram showing a location update with a CS network according to a further embodiment of the invention.

FIG. 9 shows the signalling for a Location Update according to the second specific embodiment, in which selected supplementary services are handled by the IMS network. Some services are allowed to execute in the CS access network, and the MSC/VLR stores supplementary service data to execute these services. Subscriber service management is always performed towards the IMS service engine (represented by the TAS-XDMS). It is also the TAS-XDMS that sends an Insert Subscriber Data with the "real" supplementary service data in the Location Update procedure below. The Insert Subscriber Data is sent upon reception of a Customized Applications for Mobile network Enhanced Logic (CAMEL) mobility trigger.

1. A Location Update request is sent from the UE.
2. The MSC/VLR invokes an Update Location operation towards the HLR (MAP 29.002).
3. The HLR invokes an Insert Subscriber Data operation in the MSC/VLR to transfer subscriber data. The message sent for the Insert Subscriber Data operation contains:

M-CSI (CAMEL Mobility Service Indication for CS), CAMEL version 3 (M-CSI, Address to "gsmSCF" in TAS, Service Key, MM Triggers=Location Update when the user terminal is in a new VLR area). Supplementary Services are provisioned but not Registered/Activated in the CS network. See also step 9 below, in which the "real" SS-Data is sent from TAS-XDMS. The HLR does not store any SS-Data in this embodiment (except for the provisioning of these). This functionality is moved out to the TAS-XDMS.

4. The MSC/VLR acknowledges the Insert Subscriber Data with an outcome report.
5. The successful Update Location operation outcome report is sent from the HLR to the MSC/VLR.
6. The Location Update procedure terminates with a Location Update Ack sent to the user terminal.
7. The MSC/VLR sends a CAMEL Mobility Management Notification to the TAS-address received in the Insert Subscriber Data operation.
8. The TAS acknowledges the message.
9, 10. The TAS generates an Insert Subscriber Data that contains the TAS determined Subscriber Services division between the CS and IMS networks, and the division may based on dynamic criteria (such as the visited network). The supplementary services are provisioned to allow a subscriber to perform SS-Operations as shown in FIG. 9. SS-Operations may not be allowed if supplementary services are not provisioned. If it is determined that some services that normally are executed by an MSC/VLR are to be handled in the IMS network, the division of services is reflected in the contents of the Insert Subscriber Data message generated by TAS. The TAS may send the Insert Subscriber Data directly to the MSC/VLR, but it is shown in FIG. 8 as going via HLR. This is to avoid confusion at the MSC/VLR if the HLR-address differs from the one received previously in the Result to Update Location.
11, 12. The MSC/VLR stores SS-Data received in Insert Subscriber Data, e.g. CLIP, CF on No Reply etc. An acknowledgement is sent to the HLR, and from the HLR to the TAS.

Figure 10:
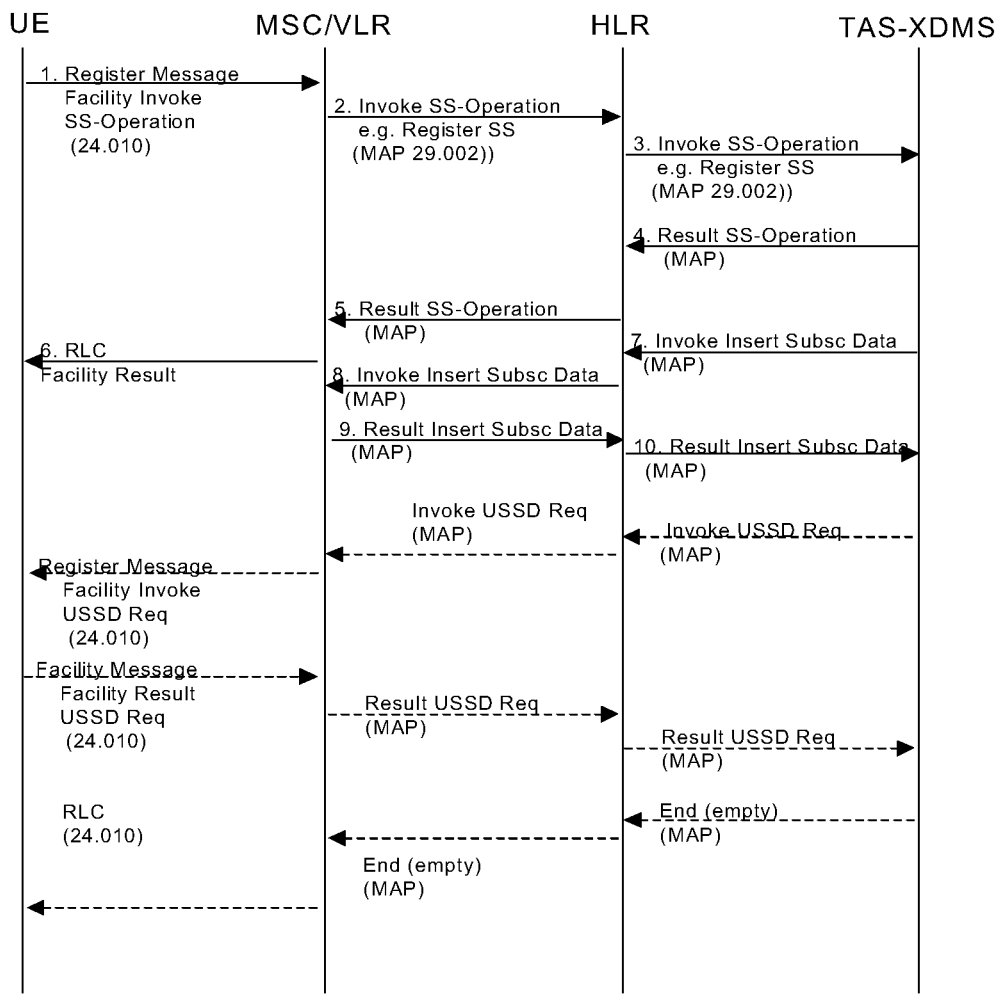
FIG. 10 is a signalling diagram showing invocation of a supplementary service according to the further embodiment of the invention.

Once a subscriber has registered with the CS access network, SS-Operations may be invoked as shown in FIG. 10.

1. The user terminal starts an SS-procedure by invoking an SS-operation, e.g. Register Call Forwarding Unconditional. A Register message containing a Facility information element carries the invoke component (24.010).
2. MSC/VLR invokes the corresponding SS-Operation in MAP (29.002). The invoke component in the Facility information element is sent as an invoke component in the MAP message (TCAP Begin).
3. No SS-operations for the telephony tele-service (TS=11) are handled at the HLR. The HLR would normally handle SS-operations, but now forwards SS-Operations for telephony to the MMTel service implementation in the IMS network. The MMTel implementation is logically grouped into a TAS and a TAS-XDMS for service management of supplementary services. It is the TAS-XDMS that handles XCAP signalling for the MMTel service. The HLR is extended with new functionality to forward SS-Operations to an "external node". The forwarding can follow the same principle as USSD to an external node, i.e. to store an address per subscriber to the node external to HLR that shall receive incoming SS-Operations. The external address is the TAS-XDMS address. The address may be a Signalling System No. 7 address (Global Title or Signalling Point Code) or an IP-address, depending on the connectivity available between the HLR and the TAS-XDMS. The request could equally be transported in another protocol, retaining the same semantics.
4. The TAS-XDMS is equipped with a MAP Plug-in for termination of MAP SS-Operations.
5. The outcome report (return result) from the TAS-XDMS is sent via the HLR to the MSC/VLR (two different MAP dialogues exist; one between the MSC/VLR and the HLR and one between the HLR and the TAS-XDMS).
6. The result of the SS-operation is reported back to the user terminal.
7, 8. After a completed SS-Operation, the TAS generates an Insert Subscriber Data reflecting the TAS determined SS division between the CS and IMS networks, i.e. which supplementary services are to be controlled by the MSC/VLR. The MSC/VLR stores SS-Data received in Insert Subscriber Data, e.g. CLIP, CF on No Reply etc. The TAS-XDMS may optionally initiate a USSD procedure to query the ICS user for additional SS-Data that is not part of the GSM/UMTS SS-Operations but available for the MMTel supplementary services The invention allows subscriber service management procedures to be performed from CS networks using GSM/UMTS SS-Procedures (SS-Operations) towards an IMS implemented service engine.

It will be appreciated by the person of skill in the art that various modifications may be made to the above-described embodiments without departing from the scope of the present invention. For example, the above description is with reference to an IMS network, but the invention can work with other types of networks such as Intelligent Network (IN), H.323 and so on.

The invention claimed is:

1. A method of sending a supplementary services message in a communications network, the method comprising:
    sending an Interrogation marker from a Home Location Register node in a Circuit Switched network to a subscriber's Mobile-services Switching Centre/Visitor Location Register, the Interrogation marker informing the Mobile-service Switching Centre/Visitor Location Register that all supplementary services messages received at the Mobile-services Switching Centre/Visitor Location Register from a user terminal are to be sent to the Home Location Register;

sending an Insert Subscriber Data message from the Home Location Register node to the subscribers Mobile-services Switching Centre/Visitor Location Register, the Insert Subscriber Data message containing a CAMEL Mobility Management Service Indication, which includes an address of an IP Multimedia Application Server associated with the subscriber and used for handling supplementary service requests;

sending a Mobility Management Notification message from the Mobile-services Switching Centre/Visitor Location Register to the addressed Application Server;

receiving at the Home Location Register node, a supplementary services message sent from the subscriber's Mobile-services Switching Centre/Visitor Location Register;

retrieving by the Home Location Register node, the address of the IP Multimedia Application Server associated with the subscriber;

sending the supplementary services message from the Home Location Register node to the addressed Application Server; and at the Application Server:

generating a further Insert Subscriber Data message, the further Insert Subscriber Data message containing an allocation determined by the Application Server of which supplementary services are to be handled in the Circuit Switched network; and sending the further Insert Subscriber Data message from the Application Server to the Mobile-services Switching Centre via the Home Location Register node.

2. The method according to claim 1, wherein the Application Server is a Telephony Application Server.

3. The method according to claim 2, wherein the Telephony Application Server is selected from a group consisting of
   a Telephony Application Server for an IP Multimedia Subsystem network;
   a Telephony Application Server-XML Document Management Server;
   a Telephony Application Server for an Intelligent Network; and
   a Telephony Application Server for an H.323 network.

4. The method according to claim 1, wherein the Application Server dynamically allocates the types of supplementary services that are handled by the Application Server, and the types of supplementary services that are handled by the Mobile-services Switching Centre/Visitor Location Register.

5. The method according to claim 4, further comprising sending a query message from the Application Server to the user terminal via the Mobile-services Switching Centre/Visitor Location Register, the query message requesting additional supplementary services data that can be transported over the Circuit Switched network using Unstructured Supplementary Service Data.

6. A Home Location Register for use in a Circuit Switched network, the Home Location Register including a processor and a memory, wherein when the processor executes computer program instructions stored in the memory, the processor causes the Home Location Register to:

generate and send an Interrogation marker to a Mobile-services Switching Centre/Visitor Location Register, the Interrogation marker informing the Mobile-services Switching Centre/Visitor Location Register to forward all supplementary service interrogation messages from a subscriber to the Home Location Register;

receive a supplementary services message sent from the subscriber's Mobile-services Switching Centre/Visitor Location Register;

retrieve an address of an IP Multimedia Application Server associated with the subscriber, wherein the Application Server is used for handling supplementary service requests;

transmit the supplementary services message to the addressed Application Server;

receive an Insert Subscriber Data message from the Application Server, the Insert Subscriber Data message containing information relating to an allocation of responsibility for handling a supplementary services request; and send the Insert Subscriber Data message to the Mobile-services Switching Centre/Visitor Location Register.

* * * * *

UNITED STATES PATENT AND TRADEMARK OFFICE
CERTIFICATE OF CORRECTION

| | | |
|---|---|---|
| PATENT NO. | : 8,489,682 B2 | Page 1 of 1 |
| APPLICATION NO. | : 12/526291 | |
| DATED | : July 16, 2013 | |
| INVENTOR(S) | : Aström et al. | |

It is certified that error appears in the above-identified patent and that said Letters Patent is hereby corrected as shown below:

In the Claims:

In Column 11, Line 4, in Claim 1, delete "subscribers" and insert -- subscriber's --, therefor.

In Column 11, Line 36, in Claim 3, delete "consisting of" and insert -- consisting of: --, therefor.

Signed and Sealed this
Third Day of December, 2013

Margaret A. Focarino
*Commissioner for Patents of the United States Patent and Trademark Office*